W. NEEF.
BAKING PAN.
APPLICATION FILED MAR. 29, 1918.

1,296,423.

Patented Mar. 4, 1919.
2 SHEETS—SHEET 1.

Inventor
William Neef

Witness
E. R. Ruppert

By Victor J. Evans
Attorney

W. NEEF.
BAKING PAN.
APPLICATION FILED MAR. 29, 1918.

1,296,423.

Patented Mar. 4, 1919.
2 SHEETS—SHEET 2.

Inventor
William Neef

Witness
E. R. Ruppert

By Victor J. Evans
Attorney

UNITED STATES PATENT OFFICE.

WILLIAM NEEF, OF POCATELLO, IDAHO.

BAKING-PAN.

1,296,423.

Specification of Letters Patent.  Patented Mar. 4, 1919.

Application filed March 29, 1918. Serial No. 225,560.

*To all whom it may concern:*

Be it known that I, WILLIAM NEEF, a citizen of the United States, residing at Pocatello, in the county of Bannock and State of Idaho, have invented new and useful Improvements in Baking-Pans, of which the following is a specification.

This invention relates to a steam baking apparatus and has for its object to produce a device of this character whereby bread, cakes, puddings or the like may be baked in a better and more expeditious manner than in the ordinary baking pans.

With the above and other objects in view the improvement resides in the construction, combination and arrangement of parts set forth in the following specification and falling within the scope of the appended claims.

Figure 1:
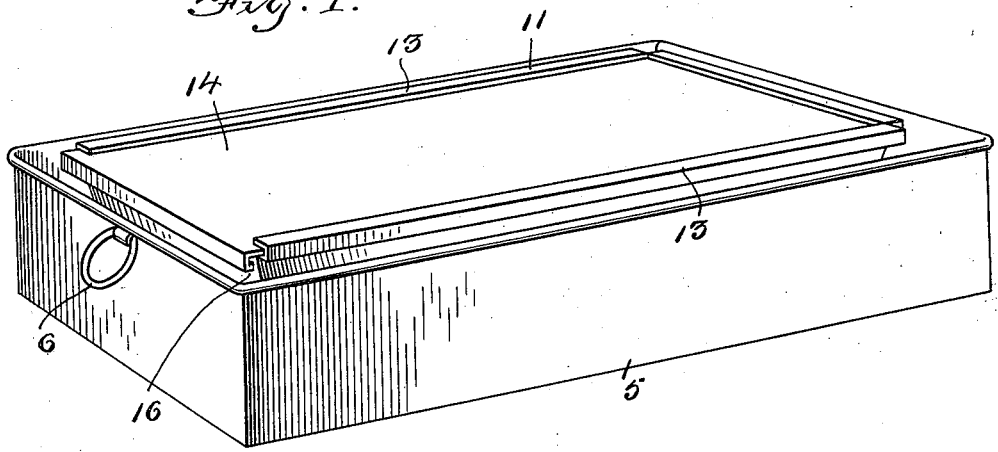
Figure 1 is a perspective view of the improvement.
Figure 2:
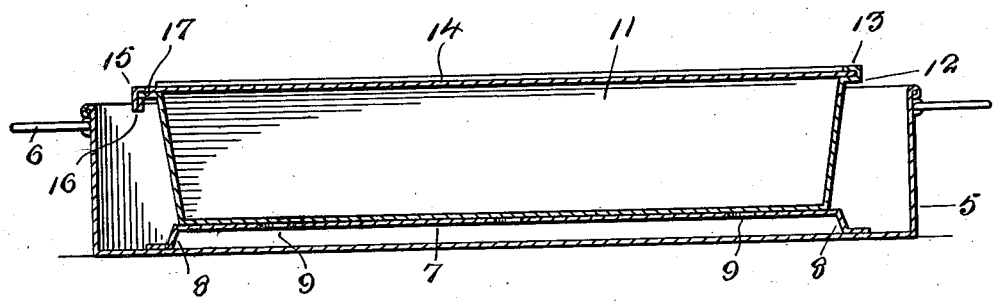
Fig. 2 is an approximately central vertical longitudinal sectional view through the same.
Figure 3:
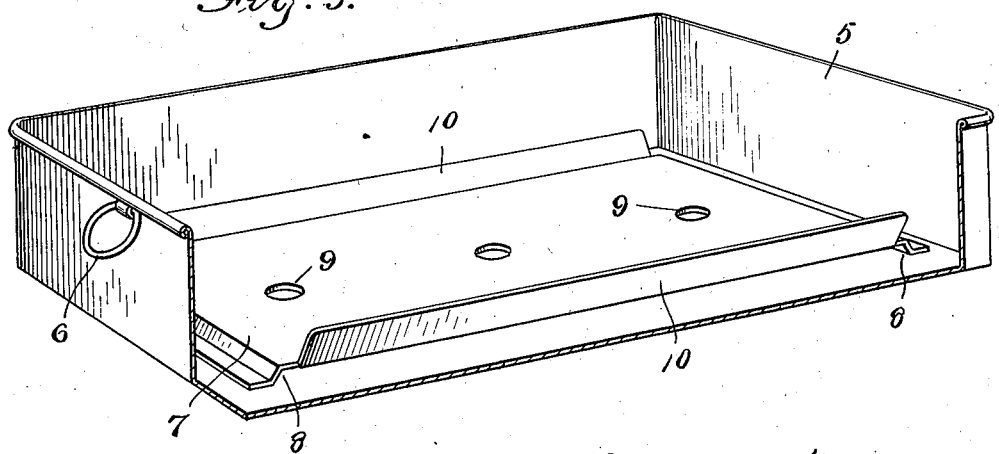
Fig. 3 is a perspective view of the boiler, parts being broken away and parts being in section.
Figure 4:
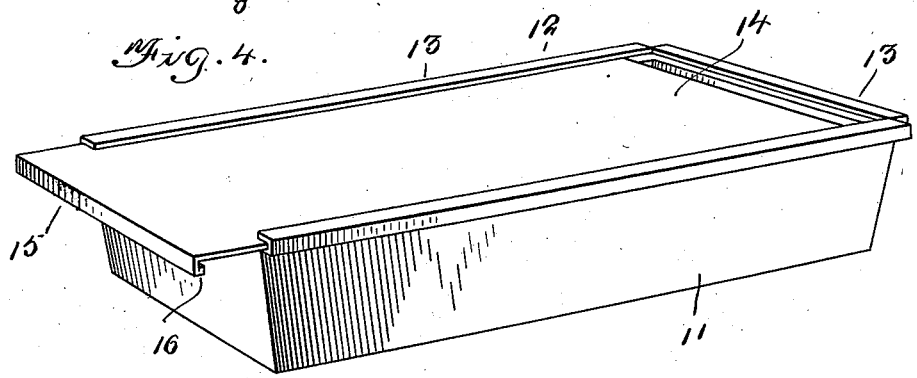
Fig. 4 is a perspective view of the pan, the lid therefor being partly removed.
Figure 5:
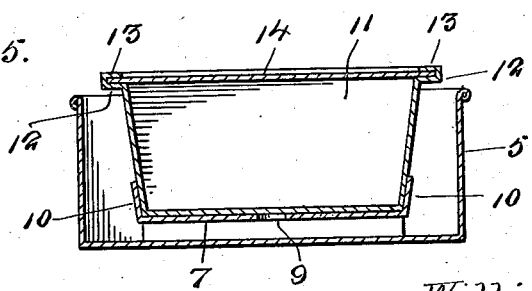
Fig. 5 is a transverse sectional view of the device illustrated in Figs. 1 and 2.

My improvement may be made in various sizes and shapes, and of any desired or preferred material.

In the showing of the drawings, the water holding pan or boiler 5 is of a rectangular formation, the same having its upper edge beaded and provided, at its ends, with hinged handles 6.

Arranged longitudinally in the pan is a flat plate 7, of a less length than the pan and which has its ends downturned or formed with angular portions 8 that are soldered or otherwise secured to the bottom of the pan. The plate is thus spaced a suitable distance above the bottom of the pan and is provided with spaced openings 9. The edges of the plate are bent to provide outwardly disposed upwardly extending flanges 10.

The baking pan 11 has its sides and ends arranged at an upward and outward inclination from the base thereof, and its said sides and ends formed with outwardly extending flanges 12. The side flanges 12, and one of the end flanges, are bent over themselves, as at 13, providing ways between the said portions 13 and the flanges proper, the said ways forming guides for the flat cover 14. The cover has its outer end bent at a downward angle, indicated by the numeral 15, and the lower edge of the said bent or flanged portion 15 is rolled or otherwise provided with an inwardly extending lip 16, and this lip may, if desired, contact beneath the flange on the end which is not provided with the overlying portion 13, and which flange for distinction is indicated by the numeral 17. This arrangement provides a practically air tight baking pan, the bottom of which rests directly on the plate 7 and having its sides engaged by the flanges 10 on the said plate. The plate 7 not only elevates the baking pan above the bottom of the boiler 5 but provides a circulating chamber for the water.

A sufficient quantity of water is first placed in the pan or boiler 5, and after the mixed dough is arranged in the baking pan and the cover is applied thereon, the said baking pan is arranged on the plate 7 in the boiler 5. By reference to the drawings it will be noted that the baking pan does not contact with the sides nor ends of the boiler. Only a comparatively small quantity of water need be arranged in the boiler, sufficient, however, to provide a circulation thereof around the bottom of the pan. The steam will flow through the top of the boiler from the sides and ends of the baking pan, but after the pan is arranged in the oven the contents thereof will be cooked by dry heat from the top of the bread, pudding or the like, which is arranged in the pan.

The steam effectively prevents the sticking of the loaf to the sides or ends of the pan, and when the pan is removed from the boiler, and the top or cover slid off of the pan, the loaf may be readily removed from the pan without breaking or crumbling thereof. If desired, the bread may be cut into slices before being removed from the pan.

What I claim is:

1. In a device for the purpose set forth, an outer pan, a perforated plate arranged longitudinally in the pan having depending flanged ends secured to the bottom of the pan, upstanding flanges on the sides of the plate, a baking pan designed to rest on the plate and to be engaged by the upstanding flanges thereof, said baking pan being of a less size than the outer pan whereby the same is spaced from the sides and ends of the said outer pan, and a slidable cover for the baking pan.

2. In a device for the purpose set forth, an outward substantially rectangular pan, a plate arranged longitudinally thereon having its ends downturned and secured to the bottom of the pan, said plate having spaced openings, said plate having its sides flanged upwardly and outwardly, a baking pan having its sides and ends inclined outwardly from its bottom and its said sides and ends flanged outwardly at the upper edge of the pan, the side flanges and one of the end flanges being bent over themselves to provide ways, a flat plate providing a cover guided through the ways, said plate having its outer end flanged and provided at its edge with an inturned portion, said inturned portion designed to frictionally engage with the straight flange on the end of the pan.

In testimony whereof I affix my signature.

WILLIAM NEEF.